United States Patent
Shila et al.

(10) Patent No.: US 12,321,448 B2
(45) Date of Patent: Jun. 3, 2025

(54) METHODS AND TECHNIQUES TO IDENTIFY SUSPICIOUS ACTIVITY BASED ON ULTRASONIC SIGNATURES

(71) Applicant: Unknot.id Inc., Winter Garden, FL (US)

(72) Inventors: Devu Manikantan Shila, Winter Garden, FL (US); Adriaan Joris H. Larmuseau, Zwevegem (BE)

(73) Assignee: Unknot.id Inc., Winter Garden, FL (US)

( * ) Notice: Subject to any disclaimer, the term of this patent is extended or adjusted under 35 U.S.C. 154(b) by 142 days.

(21) Appl. No.: 17/228,538

(22) Filed: Apr. 12, 2021

(65) Prior Publication Data

US 2021/0319803 A1    Oct. 14, 2021

Related U.S. Application Data

(60) Provisional application No. 63/009,066, filed on Apr. 13, 2020.

(51) Int. Cl.
*G06F 21/55* (2013.01)
*G06F 18/214* (2023.01)
(Continued)

(52) U.S. Cl.
CPC .......... *G06F 21/554* (2013.01); *G06F 18/214* (2023.01); *G06F 21/32* (2013.01);
(Continued)

(58) Field of Classification Search
CPC ......... G10L 17/00; G10L 17/04; G10L 17/22; G10L 25/03; G10L 25/51; G06F 21/316;
(Continued)

(56) References Cited

U.S. PATENT DOCUMENTS

| | | | |
|---|---|---|---|
| 2006/0161870 A1* | 7/2006 | Hotelling | G06F 3/0412 715/863 |
| 2010/0178956 A1* | 7/2010 | Safadi | G10L 15/065 455/563 |

(Continued)

OTHER PUBLICATIONS

Klinaku, Shukri. "Galilean relativity and the Doppler effect are a single phenomenon." Physics Essays 32, No. 4 (2019): 474-476. (Year: 2019).*

(Continued)

*Primary Examiner* — Daniel C Washburn
*Assistant Examiner* — Paul J. Mueller
(74) *Attorney, Agent, or Firm* — Quarles & Brady, LLP

(57) ABSTRACT

Various embodiments of an apparatus, methods, systems and computer program products described herein are directed to a Detection Engine that triggers playback of an audio signal at a defined frequency from a speaker module associated with a computing device. The Detection Engine receives a reflected signal captured by a microphone module associated with the computing device. In some embodiments, the reflected signal corresponds to the triggered audio signal. The Detection Engine determines whether there is suspicious activity occurring with respect to the computing device based on at least one characteristic of the reflected signal.

28 Claims, 10 Drawing Sheets

(51) Int. Cl.
  *G06F 21/32*   (2013.01)
  *G06N 20/00*   (2019.01)
  *G06V 20/52*   (2022.01)
  *G06V 40/20*   (2022.01)
  *G10L 17/04*   (2013.01)
  *G10L 17/22*   (2013.01)
  *G10L 25/03*   (2013.01)
  *G10L 25/51*   (2013.01)

(52) U.S. Cl.
  CPC ............ *G06N 20/00* (2019.01); *G06V 20/52* (2022.01); *G06V 40/20* (2022.01); *G10L 17/04* (2013.01); *G10L 17/22* (2013.01); *G10L 25/03* (2013.01); *G10L 25/51* (2013.01)

(58) Field of Classification Search
  CPC ..... G06F 21/32; G06F 21/554; G06K 9/6256; G06N 20/00; G06V 20/52; G06V 40/20
  See application file for complete search history.

(56) References Cited

U.S. PATENT DOCUMENTS

| | | | |
|---|---|---|---|
| 2013/0154919 A1* | 6/2013 | Tan | G06F 3/03 |
| | | | 345/156 |
| 2017/0104740 A1* | 4/2017 | Hoy | H04L 63/1441 |
| 2017/0163620 A1* | 6/2017 | Muttik | H04L 63/08 |
| 2020/0005295 A1* | 1/2020 | Murphy | G06Q 20/405 |
| 2020/0293116 A1* | 9/2020 | Udall | G06V 40/20 |
| 2021/0231615 A1* | 7/2021 | Munemoto | G01N 29/036 |

OTHER PUBLICATIONS

Sivakorn et al., "I'm not a human: Breaking the Google reCAPTCHA," Black Hat ASIA 2016.

\* cited by examiner $$R(t) = \cos\left[2\pi f_t t - \frac{4\pi x_o}{\lambda} - \frac{4\pi x(t)}{\lambda} - \phi\left(t - \frac{2x_o}{c}\right)\right] \quad \text{—502}$$

$$B(t) = \cos\left[\frac{4\pi x(t)}{\lambda} + \Delta\phi(t)\right] \quad \text{—504}$$

FIG. 5

METHODS AND TECHNIQUES TO IDENTIFY SUSPICIOUS ACTIVITY BASED ON ULTRASONIC SIGNATURES

CROSS-REFERENCE TO RELATED APPLICATIONS

This application claims the benefit of U.S. Provisional Application No. 63/009,066, filed on Apr. 13, 2020, which is hereby incorporated by reference in its entirety.

BACKGROUND

In the field of computer science, artificial intelligence ("A.I.") networks, such as neural networks and deep learning networks, are increasingly being employed to solve a variety of tasks and challenging problems. Such A.I. networks can consist of layers of computational graphs with nodes representing computational operations and connections in between those operations and/or computational graphs with filters representing the extraction of features from input data. Each operation computes or extracts something from the input data and/or previous layer in order to produce output data and/or next layer. Within A.I. networks there are fairly predefined operations, and there can be, e.g., hundreds or thousands of these operations. Such operations can represent such computational tasks as matrix multiplication and convolution, often using many pieces of input data from within the network.

SUMMARY

Conventional systems are deficient with respect to utilizing data captured by audio sensors of computing devices in order to detect an unauthorized use of a computing device.

Various embodiments of a Detection Engine described herein provide for significant improvements and advantages over such conventional systems. Various embodiments of the Detection Engine provide such significant improvements by the processing and analyzing invisible signatures in reflected signals that indicate presence of an actual human being using a computing device and to further determine whether that human being is an authorized user of the computing device.

Various embodiments of a Detection Engine exploit audio sensors available in a smartphone to develop a frictionless, secure and multi-factor technology that can be used by an end system (e.g., edge device, human agents, service bots or an online service) to rapidly identify unauthorized access (e.g., by an automated bot or an unauthorized human) and prevent access to the end system. In various embodiments, an end system may be an IoT (Internet-of-Things) device, such as a smart lock.

Various embodiments of an apparatus, methods, systems and computer program products described herein are directed to a Detection Engine that triggers playback of an audio signal at a defined frequency from a speaker module associated with a computing device. The Detection Engine receives a reflected signal captured by a microphone module(s) associated with the computing device. In some embodiments, the reflected signal corresponds to the triggered audio signal and is a result of the triggered audio signal being reflected back towards the microphone module. The Detection Engine determines whether there is suspicious activity occurring with respect to the computing device based on at least one characteristic of the reflected signal.

In some embodiments, the Detection Engine may be implemented as one or more software modules for execution on a mobile computing device (e.g. a smartphone). In various embodiments, the Detection Engine may be one or more software modules embedded in $3^{rd}$ party software application implemented for execution on the mobile computing device. In other embodiments, the Detection Engine may be implemented on a cloud computing platform which is accessed by a computing device seeking access to and end system. Embodiments of the Detection Engine may be implemented according to one or more software modules distributed amongst a computing device and a cloud computing platform.

According to some embodiments, the Detection Engine processes and analyzes characteristics of a reflected signal captured by a microphone of the computing device. The characteristics may indicate sound signatures representative of performance of physical gestures at the computing device, signatures of a presence of a human being proximate to the computing device and/or signatures of sound resulting from the audio signal being generated by one or more components of a particular type of computing device.

In some embodiments, the Detection Engine processes and analyzes the reflected signal in order to determine whether current use of the computing device is being performed by an actual, authorized human being or being controlled via a bot program. Upon determination that a bot program is controlling the computing device, the Detection Engine determines presence of suspicious activity.

Various embodiments of the Detection Engine provide for detection of activities possibly occurring at a computing device such as, for example, human tapping, scrolling, chatting, zooming resulting from finger movements and/or finger swipe movements and/or lip movements due to a human speaking, etc. By detecting such activities according to their signatures in a reflected signal, the Detection Engine creates a multi-factor, frictionless and reliable bot detection and user authentication framework by including the analysis of invisible, imperceptible ultrasonic signatures to analysis of other types of sensor data, such as data generated by an accelerometer, a gyroscope, a global positioning system (GPS), a network and/or phone discrete states.

Various embodiments of a Detection Engine employ adaptive signal frequencies and/or a signal encoded with a unique code(s) or identifier(s) (e.g. watermark).

Various embodiments of a Detection Engine may be utilized to determine whether a replay attack and/or a voice impersonation attack (such as deepfake, voice replay) is occurring.

Various embodiments include a module(s) and/or one or more functionalities to redact privacy information/data, to encrypt information/data and to anonymize data to ensure the confidentiality and security of user data as well as compliance with data privacy law(s) and regulations in the United States and/or international jurisdictions.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 5 illustrates aspects of a signal processing technique according to various embodiments described herein.

DETAILED DESCRIPTION

Figure 1A:
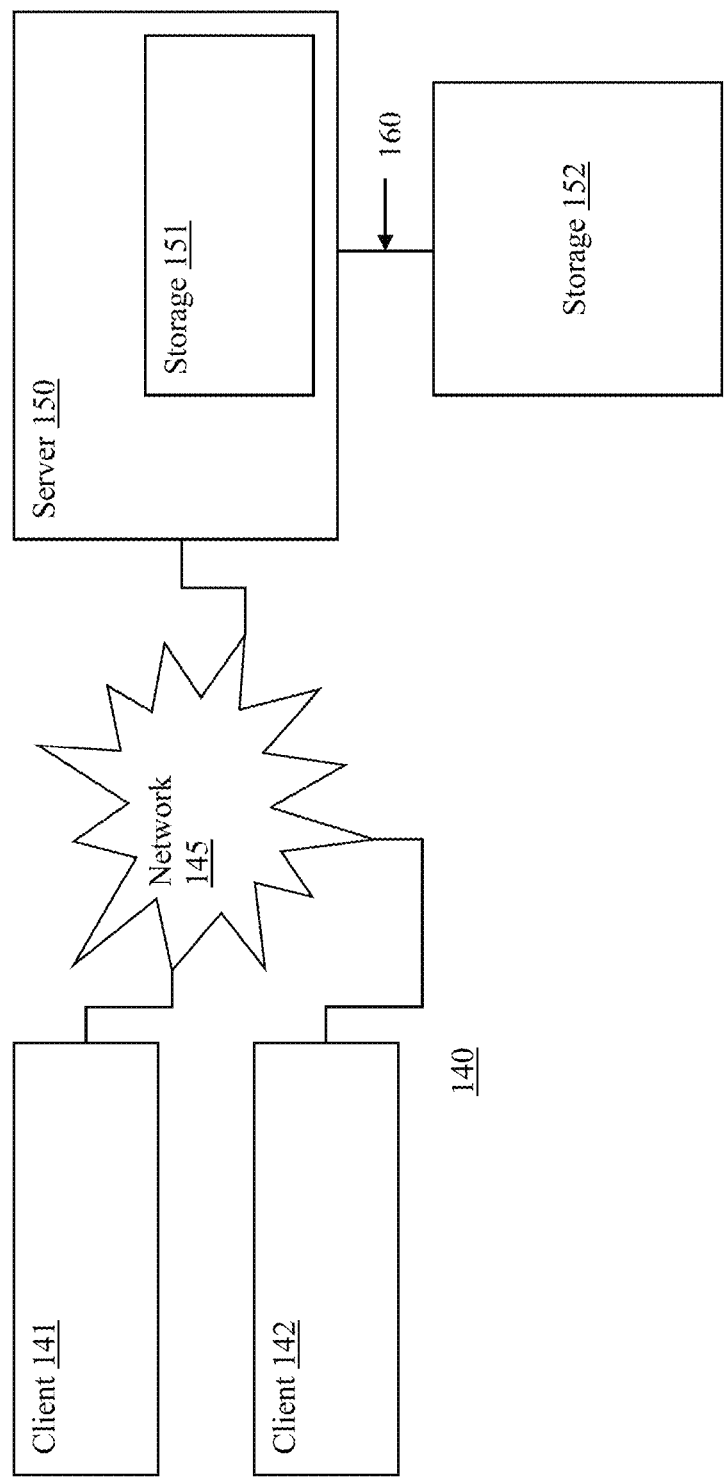
FIG. 1A is a diagram illustrating an exemplary environment in which some embodiments may operate.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention. Some of the embodiments, but not all embodiments, or their aspects are illustrated in the drawings.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform any method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
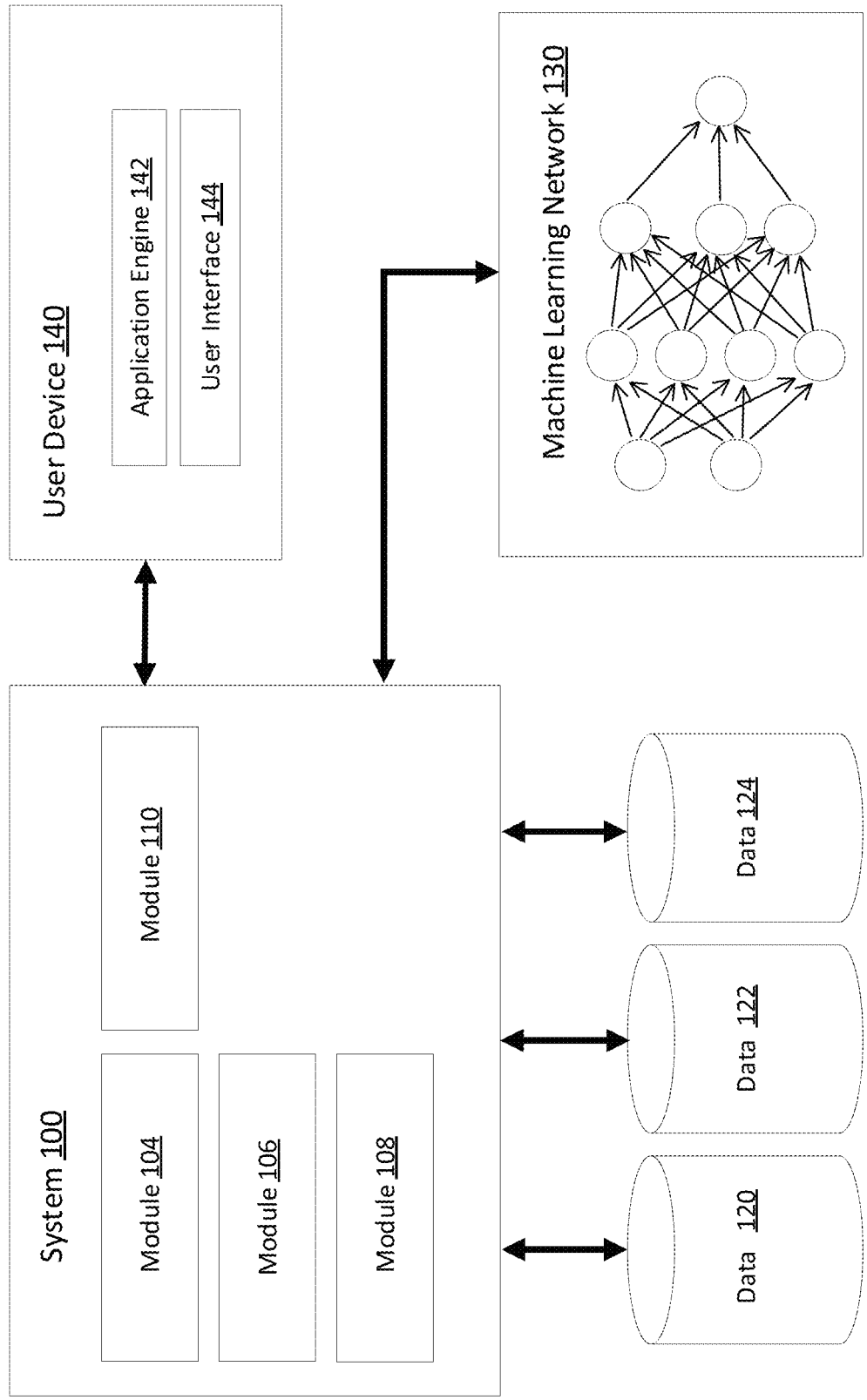
FIG. 1B is a diagram illustrating an exemplary environment in which some embodiments may operate.

FIG. 1B illustrates a block diagram of an example system 100 for a Detection Engine that includes respective modules 104, 106, 108, 110 . . . for initiating, implementing and/or executing any of the operations, steps, methods, processing, data capture, data transmission, data generation, calculations and/or data presentation described herein and illustrated by any of FIGS. 2, 3, 4, 5 and/or 6. The system 100 may communicate with a user device 140 to display output, via a user interface 144 generated by an application engine. The respective modules 104, 106, 108, 110 may be software modules and/or hardware modules.

While the databases 120, 122 and 124 are displayed separately, the databases and information maintained in a database may be combined together or further separated in a manner the promotes retrieval and storage efficiency and/or data security. It is understood that, in various embodiments, one or more of the modules 104, 106, 108, 110 . . . may reside and be implemented on the user device 140. In addition, respective portions of one or more of the modules 104, 106, 108, 110 . . . may reside and be implemented on the user device 140, while other portions of the same one or more modules 104, 106, 108, 110 . . . may reside and be implemented remotely from the user device 140.

Figure 2:
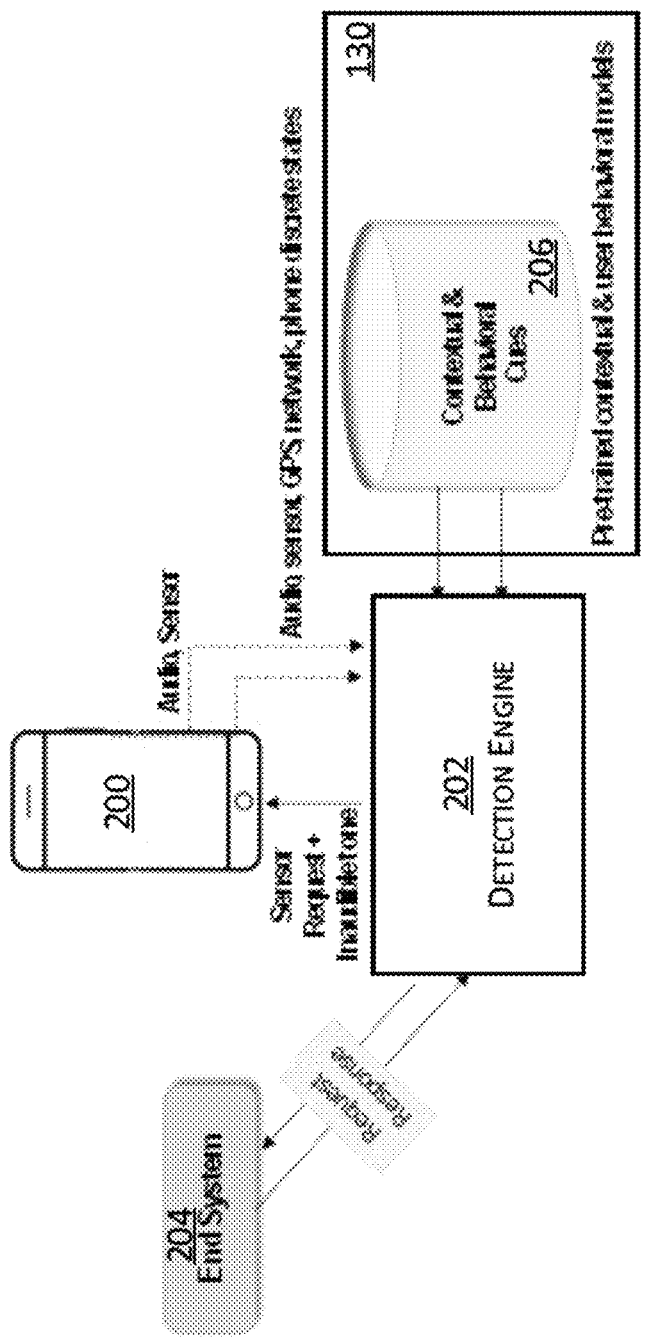
FIG. 2 is a diagram illustrating an exemplary environment in which some embodiments may operate.

As shown in flowchart 200 of FIG. 2, a 3$^{rd}$ party software application executing on a mobile computing device 200 may send an access request to an end system 204. For example, the end system 204 may be a remote corresponding online resource, such as a 3$^{rd}$ party software platform. The Detection Engine 202 may be executing on the mobile computing device 200. For example, the Detection Engine 202 may be embedded in a 3$^{rd}$ party mobile banking application that runs on the mobile computing device 200 for accessing a mobile banking software platform.

The Detection Engine 202 receives a service request from the end system 204 due to the access request. In response to the service request, the Detection Engine 202 triggers one or more prompts requesting certain types of computing device input at the computing device 200. For example, a prompt may request an entity (i.e. a possible actual human being, possible bot program) currently controlling the computing device 200 to vocalize one or more words and/or perform various types of touchscreen gestures (e.g. one or more taps, one or more finger swipes). In various embodiments, the Detection Engine 202 does not trigger prompts. Instead, the Detection Engine 202 may implicit monitor to determine when an entity (i.e. a possible actual human being, possible bot program) is controlling (i.e. speaking, typing, sending input) the computing device 200

In conjunction with delivery of the prompts (or during implicit monitoring), the Detection Engine 202 plays an inaudible tone that is imperceptible to the human ear. Or in such embodiments directed to implicit monitoring, the Detection Engine 202 plays the inaudible tone while it monitors for activity or actions of an entity (i.e. a possible actual human being, possible bot program). In various embodiments, the Detection Engine 202 selects a frequency for the tone from a range of, for example, 19 to 22 kHz. In other embodiments, the Detection Engine 202 may encode a watermark, such as a unique encoding, into the tone. A reflected signal will be captured by an audio sensor of the mobile computing device 200 generated as a result of the played inaudible tone coming into contact with various features of the computing device's 200 external environment and being reflected back towards the mobile computing device 200. The Detection Engine 202 verifies that the reflected signal is authentic and corresponds to the tone by confirming that the reflected signal has the same frequency selected for the tone. In addition, the Detection Engine 202 can further verify the authenticity of the reflected signal by identifying the encoded watermark in the reflected signal when the tone was encoded with the watermark. By utilizing adaptive selection of different tone frequencies and/or the encoding of varying watermarks into respective inaudible tones, the Detection Engine 202 adds a level of security to ensure that a received reflected signal is not a copy of a previously sent tone because the previously sent tone will not be at the frequency and/or include the watermark of actual tone the Detection Engine 202 that was recently used.

In addition, one or more internal components of the computing device 200 may cause the played inaudible tone to have various characteristics and the reflected signal may further include signatures that correspond to the various characteristics associated with the components of the computing device 200. For example, internal components of a particular mobile computing device model from a particular manufacturer may result in the inaudible tone having certain signatures that differ from an inaudible tone generated by a different mobile computing device model that has different internal components.

In various embodiments, the reflected signal may further include characteristics representative of a sound(s) that corresponds with physical gestures and/or input commands at the computing device 200. For example, the reflected signal may include characteristics of sound created by tapping on a smartphone touchscreen. In various embodiments, the reflected signal may further include characteristics that indicate presence of a human body proximate to the computing device 200 off of which the inaudible tone reflected back to the computing device 200.

The Detection Engine 202 processes and analyzes the reflected signal to determine whether an actual human being is currently using the computing device 200 and/or whether input commands associated with the computing device 200 are being generated by a bot program. For example, if a bot program is controlling the computing device 200, then the reflected signal would fail to include one or more signatures of a human body proximate to the computing device and/or one or more signatures of sound resulting from various types of physical gesture input commands performed at the computing device 200.

In various embodiments, the Detection Engine 202 processes and analyzes the reflected signal by generating machine learning network input based on one or more characteristics of the reflected signal. The Detection Engine 202 feeds the machine learning network input into a machine learning network 130. In some embodiments, the machine learning network 130 may be trained based on training data that represents contextual and behavioral cues related to user behavior and use of various types of computing devices.

In various embodiments, the Detection Engine may determine presence of suspicious activity resulting from voice impersonation (or voice replay, or voice recreation) attack. A particular type of a voice impersonation attack is a deepfake voice attack. Deepfake voice attacks rely on the deployment of highly realistic and natural sounding fake voices that are indistinguishable from actual voices to the human ear. In such embodiments, the Detection Engine transmits in inaudible signal and captures a subsequent reflected signal. The Detection Engine feeds machine learning input based, at least in part, on signatures (or features) in the received reflected signal into a machine learning network(s).

The machine learning network(s) can be trained to recognize signatures (or features) in a signal that represents the occurrence of various types of body gestures that typically accompany the use of various types of computing devices. The machine learning network(s) are further trained recognize signatures (or features) in a signal that represents the occurrence of various types of body gestures that typically accompany a hands-free use of various types of computing devices, such as use of a phone or desktop computer. The machine learning network(s) can be trained to recognize signatures (or features) in a signal that the represent body gestures of a particular authorized individual in order to generate output indicating whether a current individual using a computing device is the particular authorized individual. Further, machine learning network(s) can additionally be trained to recognize signatures (or features) in a signal that represent one or more internal components of a particular type of computing device regularly used by particular authorized individual. The Detection Engine can further determine whether the particular type of computing device is in use based on determining whether a reflected signal includes signatures (or features) that correspond to the one or more known internal components. By training the machine learning networks on signal signatures (or features) of various types of body gestures, various types of body gestures of a particular individual(s), various types of internal components of a computing device associated with the particular individual, Detection Engine can be deployed to accurately identify whether a captured reflected signal originates from a deepfake voice attack.

Figure 3:
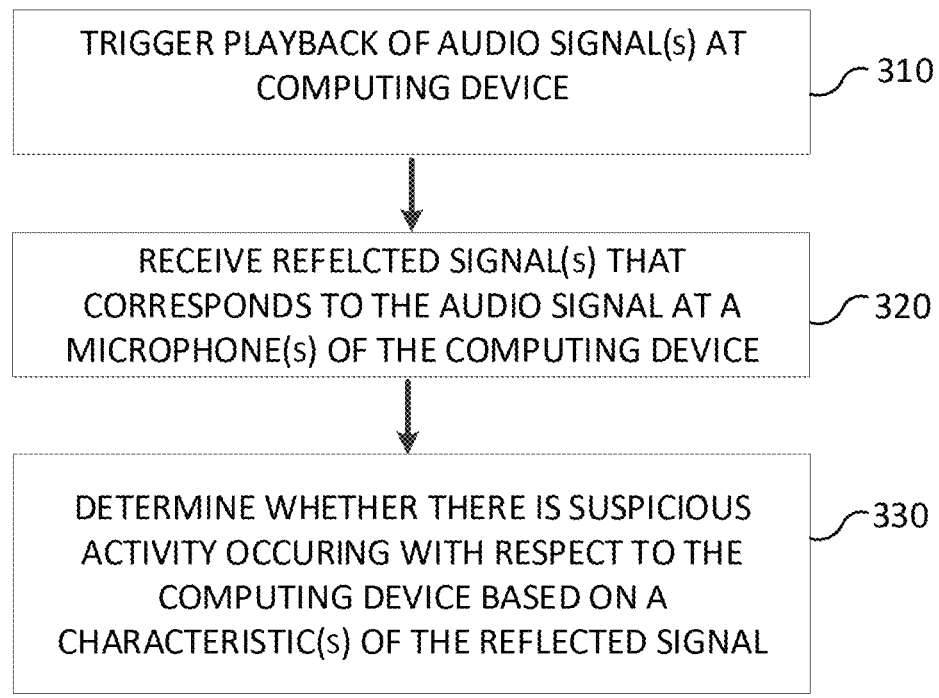
FIG. 3 is a diagram illustrating an exemplary method that may be performed in some embodiments.

As shown in flowchart 300 of FIG. 3, the Detection Engine triggers playback of an audio signal at a computing device. (Act 310). In various embodiments, the Detection Engine receives a notification from an end system indicating that the computing device is attempting to access the end system.

The Detection Engine initiates one or more prompts at the computing device in order to request certain types of input be provided at the computing device. The Detection Engine implements the prompts to be executed at the computing device in conjunction with playback of a tone at the computing device. For example, the tone may an inaudible tone that is imperceptible to the human ear.

For example, if the computing device is being currently used by an actual individual (i.e. user), the Detection Engine may prompt the user for certain types of device input, such as: performance of one or more taps, vocalization of one or more words and/or performance of one or more types of hand gestures on a touchscreen. As the user performs the prompted device input, the inaudible tone played by the speaker will be reflected off the user's body thereby creating a reflected signal that corresponds to the inaudible tone. In addition, the reflected signal will further include signatures based on audio created by the user performing the prompts. For example, the reflected signal may include various types of signatures that indicate noise created by a finger(s) tapping on a touchscreen and/or signatures that indicate noise created by one or more types of finger swipes.

The Detection Engine receives a reflected signal that corresponds to the audio signal at a microphone of the computing device. (Act 320). The Detection Engine captures, via the microphone of the computing device, the reflected signal during receipt at the computing device of the types of prompted computing device input. For example, the Detection Engine captures the reflected signal as the user performs the prompted type(s) of input commands at the computing device. The reflected signal may include various types of signatures that correspond to one or more of the following: one or more types of computing device components, presence of a human body proximate to the computing device, sound resulting from input being provided to the computing device (i.e. taps, finger swipes).

The Detection Engine determines whether there is suspicious activity occurring with respect to the computing device based on a characteristic(s) of the reflected signal. (Act 330) In various embodiments, the Detection Engine feeds one or more portions of the reflected signal into a machine learning network in order to analyze the various signatures included in the reflected signal. A first stage of the analysis attempts to determine whether various signatures in the reflected signal indicate certain types of gestures and the presence of a human body near the computing device. A second stage of the analysis attempts to determine whether various signatures correspond to one or more components of a particular type of computing device. A third stage of the analysis leverages data specific to a user(s) in order to determine that an individual currently using the computing device is an authorized user and therefore should be granted access to an end system via the computing device. However, if the computing device is not currently being used by an actual individual, the reflected signal will not have the various characteristics of signals reflected of the human body and the Detection Engine may determine that suspicious activity occurring via the computing device.

In various embodiments, the Detection Engine may rely on device recognition to determine whether suspicious activity is occurring. For example, the Detection Engine may have an identification of an authorized user of a particular device and the invention may have access to data describing one or more internal components of that particular device. As such, the invention may determine whether suspicious activity is occurring based on detecting signatures of certain internal components of that particular device in the reflected signal.

Figure 4A:
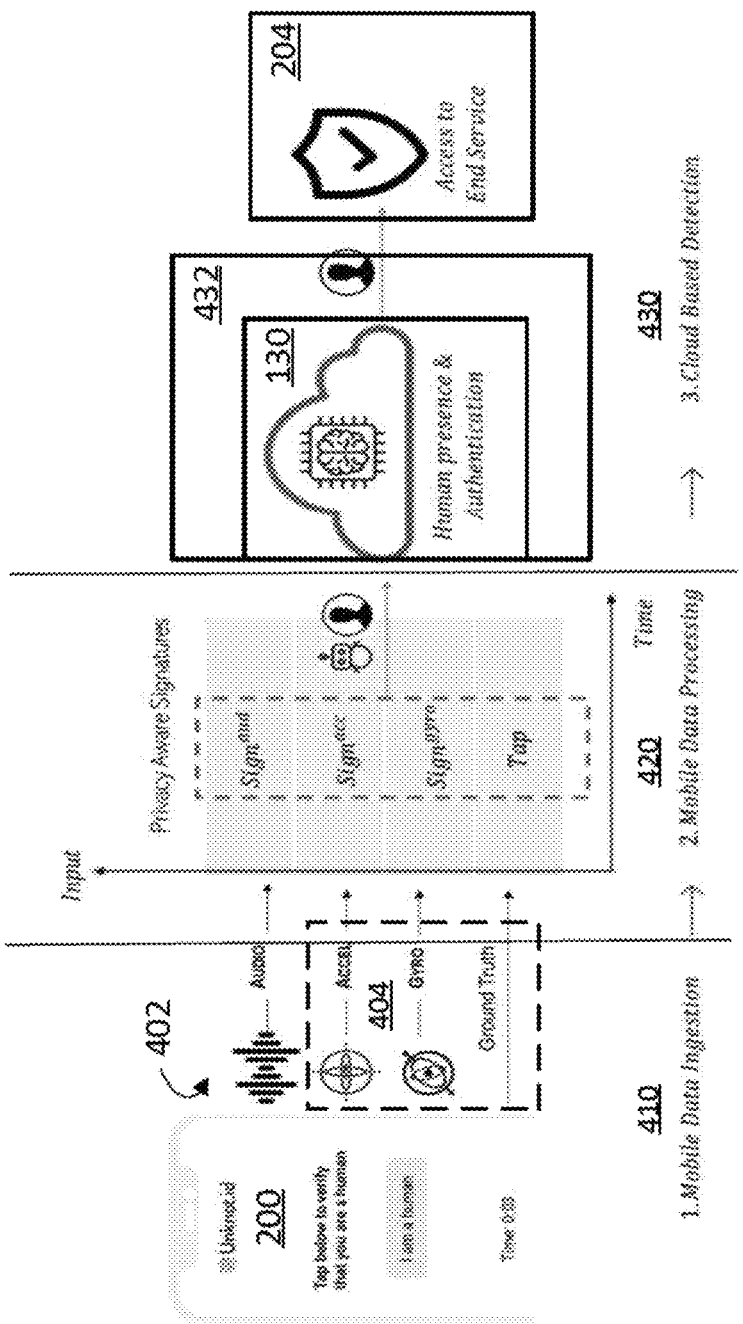
FIG. 4A is a diagram illustrating an exemplary environment in which some embodiments may operate.

As shown in FIG. 4A, during a data ingestion phase 410, the Detection Engine generates one or more high frequency sound waves using speakers of the computing device. In one embodiment, the Detection Engine supports a predefined number prompted input commands. The Detection Engine may generate an inaudible tone for each type of input command. For example, the Detection Engine generates a cosine wave at a high frequency (e.g. 12 kHz-20 kHz, 19 kHz-20 kHz, depending on computing device capabilities) using a sample rate fixed at 44100 Hz.

The Detection Engine may further capture auxiliary data 404, such as ground truth data (i.e. a computing device model identifier, a task identifier, user provided notes, one or more timestamps indicating audio generation and reception) and data from raw motion sensors (i.e. accelerometer, gyroscope). In order to localize a distance between an alleged user of a computing device and the computing device itself, the Detection Engine may implement a short (for example, one millisecond) monaural tone played before playback of an experimental task's cosine wave. For clear separation of the two waves, the Detection Engine may introduce a moment of silence between the monaural tone in the cosine wave.

In various embodiments, the Detection Engine collects sensor values in fixed intervals in conjunction with the changes in the inaudible tone. For example, the Detection Engine utilizes audio sensors (i.e. microphone and speaker) commonly available in computing devices (such as smartphones) to generate inaudible acoustic signals that can capture human motion signatures such as chest movements due to breathing and heartbeats, abdomen movements, hand vibrations while holding the computing device and/or performance of hands-free interaction (e.g. lip movements) with the device. In various embodiments, the Detection Engine may also capture auxiliary data 404 based on data from additional underlying sensors of the computing device, such as and accelerometer and/or a gyroscope. For example, when a user inputs login credentials and/or taps or swipes on a touchscreen, the sensor value(s) changes which in turn is captured to extract user specific signatures. In addition, sensor stream values collected at fix time intervals may be used. In the event of hands-free interactions, the ultrasonic signatures containing user breathing patterns, body movements, gestures such as lip movements from speaking are used to authenticate the user.

During a data processing phase 420, recorded wave files 402 and the auxiliary data 404 in the cosine wave's reflected signal are anonymized in order to adhere to various type of data privacy requirements and/or regulations. The Detection Engine transmits reflected sound wave files 402 received by the computing device's microphone with auxiliary data 404 to a cloud platform 432 for further processing and analysis in real-time during a cloud-based detection phase 430.

Figure 4B:
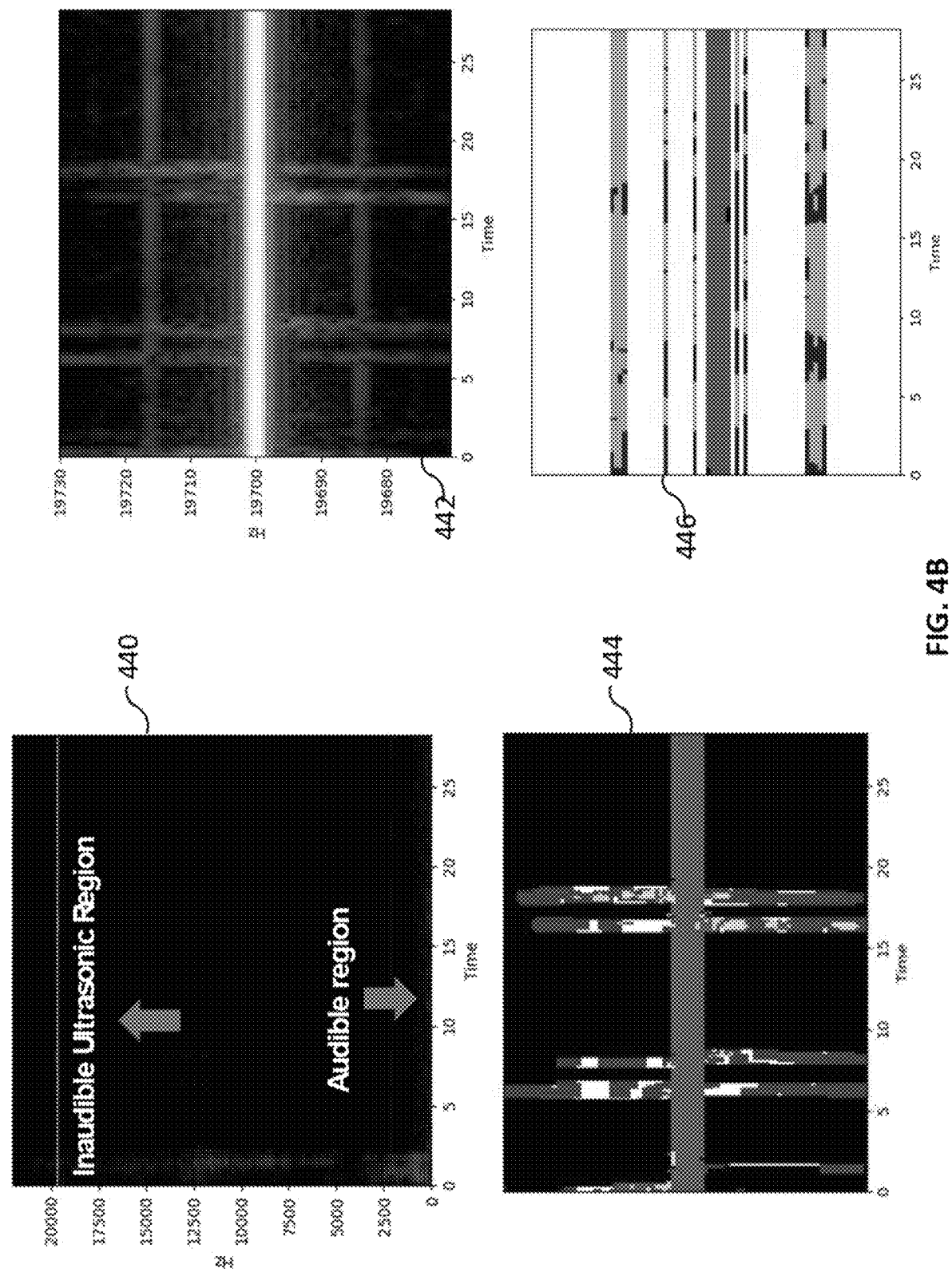
FIGS. 4B and 4C are each a diagram illustrating various detections related to an exemplary environment in which some embodiments may operate.

As shown in FIG. 4B, various spectrograms 440, 442, 444, 446 correspond to reflected signals from a particular type of computing device in use by a human being. Spectrogram 440 illustrates a frequency range for adaptive selection of a frequency for an inaudible tone. Spectrogram 442 for a frequency range between 19.6 kHz and 19.8 kHz illustrates time, frequency, and power features extracted by the Detection Engine by application of signal processing techniques on the transmitted tone and the reflected sound signal. Spectrogram 444 illustrates one or more signatures in a reflected signal that corresponds to movement of the individual's lips and/or hands and one or more signatures (or features) obtained in the adaptive frequency range (19 kHz-22 kHz) of the reflected signal the Detection Engine utilizes in order to identify presence of a human being at the computing device related to the reflected signal and/or to identify various internal components of the computing device spectrogram 446 illustrates signatures (or features) in the reflected signal the Detection Engine utilizes to identify whether the computing device has one or more expected internal components.

Figure 4C:
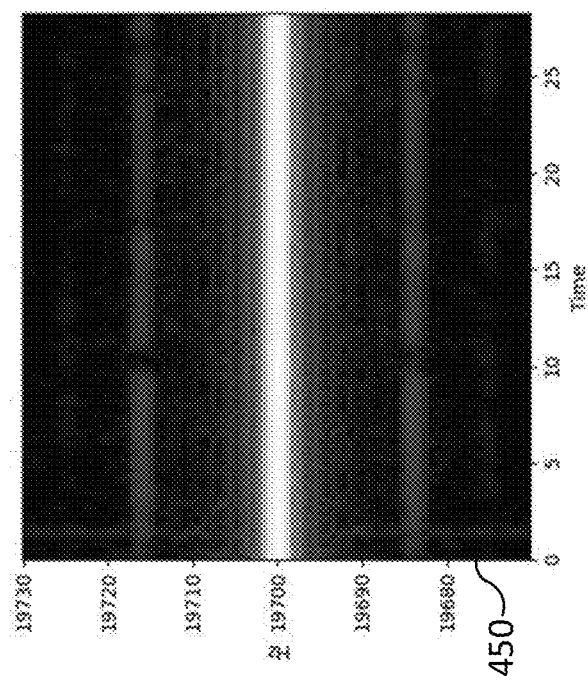

As shown in FIG. 4C, illustrates a spectrum 450 that corresponds to reflected signals from a particular type of computing device in use by an artificial process, such as a bot program. Spectrogram 450 lacks the vertical signatures (or features) (as shown in spectrograms 442, 446) that are indicative of a human being's actions or near at the computing device, such as talking, tapping, scrolling, etc.

As shown in FIG. 5, the Detection Engine implements a signal processing technique for analysis of respective reflected signals. In various embodiments, the signal processing technique may be executed during the cloud-based detection phase 430. When an individual's chest, hand, finger(s) and/or lips move while breathing and/or performing a prompted input command (i.e., tapping, scrolling, swiping, speaking), such resulting physical movements induce a shortening of the received reflected wave-front (due to the approaching target), whereby the frequency increases and a positive Doppler shift is observed together with an expanded wave-front with a negative frequency shift due to a departing target.

The reflected signal received by a computing device microphone(s) may contain the transmitted signal modulated by a motion frequency of the target(s) off of which it was reflected. The Detection Engine's signal processing technique seeks to extract Doppler frequency shifts from the reflected signal. In some embodiments, given the reflected signal, R(t) 502, the Detection Engine derives a baseband signal B(t) 504. An upper and the lower envelope are phase-shifted by 180° and summed to obtain a final noisy-free baseband signal. According to the signal processing technique, x(t) represents a mechanical displacement of the target, $x_o$ represents a nominal distance between the target and the sonar and $\Delta\phi(t)$ represents a residual phase noise from an oscillator.

Figure 6:
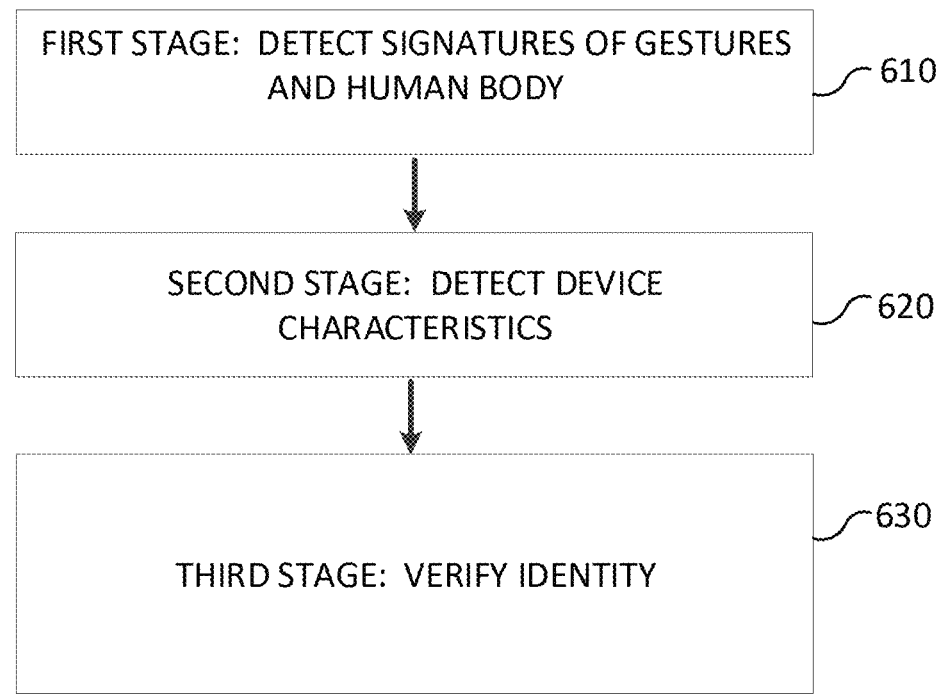
FIG. 6 is a diagram illustrating an exemplary method that may be performed in some embodiments.

As shown in flowchart 600 of FIG. 6, the first stage of analysis of the reflected signal by the Detection Engine includes determining whether the reflected signal includes one or more types of signatures that correspond to physical gestures at the computing device and presence of a human body proximate to the computing device. (Act 610) For example, various types of signatures of the reflected signal may indicate that certain types of physical gestures were actually performed upon the touchscreen of the computing device. In addition, various types of signatures may be present in the reflected signal that are highly correlated with a proximate presence of a human body. If such signatures are present in the reflected signal, then the Detection Engine determines that an actual human being is currently using the computing device as opposed to a bot program. However, the first stage of analysis still does not verify whether that actual human being currently using the computing device is authorized to access an end system via that computing device.

The second stage of analysis of the reflected signal by the Detection Engine includes determining whether the reflected signal includes various types of signatures that correspond to particular types components of various types of computing devices. (Act 620) In various embodiments, since different types of computing devices use different types of internal components, the inaudible tone played at a computing device will likely include various types of signatures that trace back to those internal components. The reflected signal will further include those various types of signatures related to internal components of the computing device. It is understood that, according to various embodiments, the $2^{nd}$ stage of analysis may be executed independently by the Detection Engine without requiring performance of the $1^{st}$ and $3^{rd}$ stages of analysis.

In various embodiments, an individual may be running a plurality of computing device emulators on a particular computing device. The individual may be running a 3rd party application on the particular computing device whereby the 3rd party application further includes an embedded instance of the Detection Engine. As the particular computing device and the various emulators attempt to access a 3rd party end system via the 3rd party application, the reflected signal may include signatures that properly identify various types of components of the particular computing device.

However, the Detection Engine will receive additional service requests from the 3rd party end system related to access requests originating from each of the emulators. Since the emulators are purely software there will be no reflected signals traced back to each emulator instance that includes signatures of actual physical computing device components. In this scenario, even though a respective reflected signal may accurately identify a type of computing device based on the individual's actual physical computing device, the Detection Engine will determine presence of suspicious activity due to the lack of device component signatures in reflected signals (or a lack of reflected signals altogether) from the emulators.

The third stage of analysis of the reflected signal by the Detection Engine includes verifying an identity of a purported user of the computing device. (Act 630) In various embodiments, analysis of a reflected signal by the Detection Engine may indicate that an actual individual is currently using the computing device and may further properly include various types of signatures of device components. As such, the Detection Engine may thereby determine that a bot program is not attempting to access an end system via the computing device. However, the Detection Engine must verify an identity of the individual prior to authorizing access to the end system.

In various embodiments, the Detection Engine may have access to certain types of stored reflected signal signatures that are unique to an authorized individual using the computing device. For example, an authorized individual may download a $3^{rd}$ party application onto their computing device. Upon instantiating the $3^{rd}$ party application, an instance of the Detection Engine embedded in the $3^{rd}$ party application may request certain types of computing device input. The Detection Engine may capture signatures of the requested computing device input performed by a specific individual which can be utilized by the Detection Engine for further verification of subsequently received reflected signals in order to grant access to a particular end system.

It is understood that in various embodiments, the Detection Engine trains the machine learning network 130 to identify certain types of signatures present in various types of reflected signals. For example, training data utilized by the Detection Engine to train the machine learning network 130 may be based on signal data resulting for various persons tapping on the screens of various types of computing devices, speaking one or more particular words/phrases and/or performing one or more finger gestures on the screens of various types of computing devices.

In various embodiments, the machine learning network 130 may be based on a filtered and denoised Fourier transform (STFT) matrix to derive multiple features, such as, for example, duration and bandwidth of each gesture, frequency shift patterns, doppler plot broadening (obtained by thresholding the frequency amplitude and calculating the remaining bandwidth around the central carrier frequency for each time step), cadence velocity and/or signal energy, peak frequencies, energy contained in peak frequencies, power spectral density.

The Detection Engine feeds the features into one or more neural networks. A first network may be a binary neural network classifier for predicting active versus passive human presence. An active prediction corresponds to a scenario when a user actively interacts with a computing device and a passive prediction corresponds to a scenario where user is present but does not directly interact with the computing device. A subsequent second network may be a multi-layer neural network architecture that predicts gesture type and performs authentication of the user based on the predicted underlying gesture.

Various embodiments of the Detection Engine may use any suitable machine learning training techniques including, but not limited to a neural net based algorithm, such as Artificial Neural Network, Deep Learning; a robust linear regression algorithm, such as Random Sample Consensus, Huber Regression, or Theil-Sen Estimator; a kernel based approach like a Support Vector Machine and Kernel Ridge Regression; a tree-based algorithm, such as Classification and Regression Tree, Random Forest, Extra Tree, Gradient Boost Machine, or Alternating Model Tree; Naïve Bayes Classifier; and other suitable machine learning algorithms.

Figure 7:
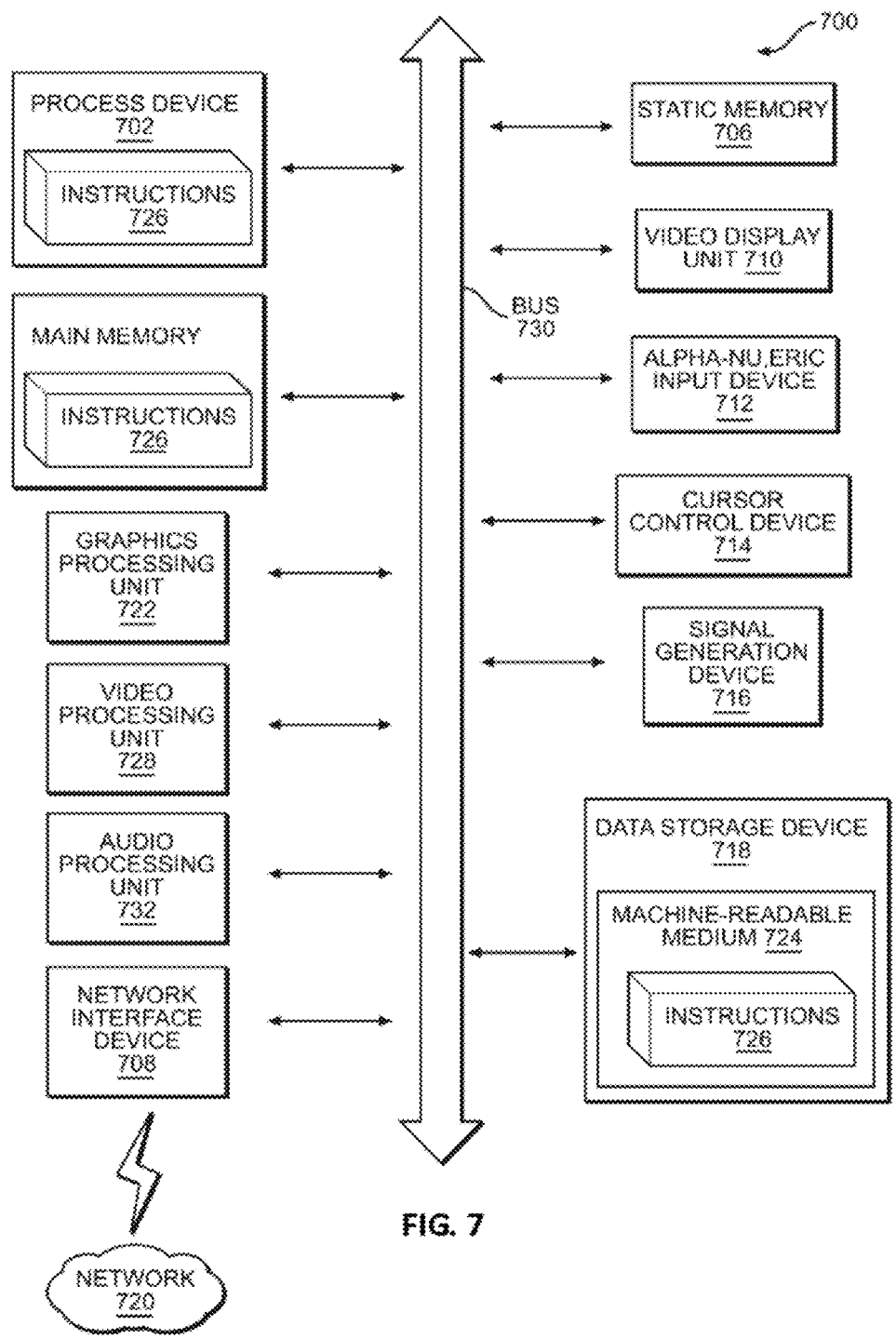
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising: receiving identity information from a user controlling a computing device; determining, using a detection engine, if the identity information corresponds to authorized user data; triggering playback of an audio signal at a defined frequency from a speaker module associated with a computing device; receiving a reflected signal captured by a microphone module associated with the computing device, the reflected signal corresponding to the triggered audio signal; determining if the reflected signal contains a sound signature resulting from one or more physical gestures performed by the user when controlling the computing device; determining whether the sound signature corresponds to the user controlling one or more internal components specific to a type of the computing device; determining there is suspicious activity occurring at the computing device based on (i) the identity information not corresponding to the authorized user data, (ii) the reflected signal not containing the sound signature resulting from one or more physical gestures performed by the user when controlling the computing device, and (iii) the sound signature not corresponding to the user controlling one or more internal components specific to a type of the computing device and upon determining the suspicious activity, preventing access to an end system computer system that is separate from the computing device.

2. The computer-implemented method of claim 1, wherein triggering playback of an audio signal at a defined frequency from a speaker module associated with a computing device further comprises: receiving a service request from the end system computer system that is separate from the computing device, the service request indicating interaction between the end system computer system and the computing device; and in response to the service request, triggering one or more prompts for one or more types of computing device input at the computing device in conjunction with playback of a tone at the computing device, the tone comprising an inaudible tone due to the defined frequency.

3. The computer-implemented method of claim 2, wherein the one or more prompts comprises instructing the user to vocalize one or more words.

4. The computer-implemented method of claim 1, wherein triggering playback of an audio signal at a defined frequency from a speaker further comprises: generating a unique watermark code; and encoding the audio signal with the unique watermark code; and wherein receiving a reflected signal further comprises: capturing the reflected signal; wherein determining whether there is suspicious activity occurring comprises: verifying an authenticity of the reflected signal by determining whether the reflected signal has at least one of: the defined frequency of the triggered audio signal and the encoded unique watermark code.

5. The computer-implemented method of claim 4, wherein verifying an authenticity of the reflected signal comprises: determining the reflected signal includes a lack of presence of the encoded unique watermark code; and based on the lack of presence of the encoded unique watermark, determining receipt of the reflected signal is associated with a replay attack, wherein the replay attack comprises submission of a signal, from an external source, that is a copy of a previously triggered audio tone that had a different watermark encoding or lacked a watermark encoding.

6. The computer-implemented method of claim 1, wherein determining the sound signature not corresponding to the user controlling one or more internal components specific to a type of the computing device further comprises: identifying one or more device characteristics that correspond to one or more known internal components of the computing device based on the one or more characteristics of the reflected signal; and determining suspicious activity is occurring based on a lack of presence of the one or more reflected signal characteristics that correspond to the one or more known internal components of the computing device.

7. The computer-implemented method of claim 1, wherein determining whether there is suspicious activity occurring with respect to the computing device comprises: generating machine learning input based on one or more characteristics of the reflected signal; feeding the machine learning input into at least one machine learning network, the machine learning network trained at least in part on training data; and determining the presence of suspicious activity occurring with respect to the computing device based at least in part on a machine learning output.

8. The computer-implemented method of claim 7, the training data based at least in part on one or more audio files representing sound characteristics of various types of physical gestures input commands performed on a plurality of types of computing devices; wherein determining whether there is suspicious activity occurring with respect to the computing device comprises: deriving and comparing the one or more characteristics of the reflected signal with expected user gestures and body movements represented by the training data; and determining whether an individual is an authorized individual based on a result of a gesture comparison.

9. The computer-implemented method of claim 1, wherein the sound resulting from at least one occurrence of contact with a surface of the computing device comprises: one or more sounds of one or more tapping physical gestures making contact with the surface during the playback of the triggered audio signal; and wherein determining there is suspicious activity comprising: confirming an absence of suspicious activity due to the sound signature from the one or more tapping physical gestures making contact with the surface during the playback of the triggered audio signal.

10. The computer-implemented method of claim 1, wherein determining there is suspicious activity includes identifying the sound signature lacks characteristics of signals reflected off the human body.

11. The computer-implemented method of claim 1, wherein determining there is suspicious activity includes identifying a lack of device component signatures in the reflected signal or lack of reflected signal.

12. The computer-implemented method of claim 1, wherein determining if the reflected signal contains the sound signature resulting from one or more physical gestures further comprises: extracting, by a detection engine, a Doppler frequency shift from the reflected signal, and detecting whether the Doppler frequency shift is a positive Doppler shift; and determining if the Doppler frequency shift is an expanded wave-front with a negative frequency shift.

13. The computer-implemented method of claim 12, wherein the sound signature has a frequency in the range of 19 kHz to 22 KHz and the reflected signal has a frequency in the range of 19.6 kHz and 19.7 kHz.

14. A system comprising one or more processors, and a non-transitory computer-readable medium including one or more sequences of instructions that, when executed by the one or more processors, cause the system to perform operations comprising: identify an identity of a user; determine, using a detection engine, if the identity of the user corresponds to authorized user data; triggering playback of an audio signal at a defined frequency from a speaker module associated with a computing device; receiving a reflected signal captured by a microphone module associated with the computing device, the reflected signal corresponding to the triggered audio signal; determining if the reflected signal contains a sound signature resulting from one or more physical gestures performed by the user when controlling the computing device; determining whether the sound signature corresponds to the user controlling one or more internal components specific to a type of the computing device; determining there is suspicious activity occurring at the computing device based on (i) the identity information not corresponding to the authorized user data, (ii) the reflected signal not containing the sound signature resulting from one or more physical gestures performed by the user when controlling the computing device and (iii) the sound signature not corresponding to the user controlling one or more internal components specific to a type of the computing device; and in response to determining there is suspicious activity, denying access to an end system computer system that is separate from the computing device.

15. The system of claim 14, wherein triggering playback of an audio signal at a defined frequency from a speaker module associated with a computing device comprises: receiving a service request from the end system computer system, the service request indicating interaction between the end system computer system and the computing device; and in response to the service request, triggering one or more prompts for one or more types of computing device input at the computing device in conjunction with playback of a tone at the computing device, the tone comprising an inaudible tone due to the defined frequency.

16. The system of claim 15, wherein receiving a reflected signal captured by a microphone module associated with the computing device comprises: capturing the reflected signal during receipt at the computing device of the one or more types of prompted computing device input.

17. The system of claim 15, wherein triggering the one or more prompts comprises instructing the user to perform a hand gesture on the surface of the computing device.

18. The system of claim 14, wherein determining whether there is suspicious activity occurring with respect to the computing device comprises: determining whether there is a physical presence of an individual proximate to the computing device based on one or more characteristics of the reflected signal; and upon determining the physical presence of the individual, identifying one or more device characteristics of the computing device based on the one or more characteristics of the reflected signal.

19. The system of claim 18, further comprising: comparing the one or more characteristics of the reflected signal with user identity validation data; and determining whether the individual is an authorized individual based on a result of the comparison.

20. The system of claim 19, the training data based at least in part on one or more audio files representing sound characteristics of various types of physical gestures input commands performed on a plurality of types of computing devices.

21. The system of claim 18, wherein determining whether there is suspicious activity occurring with respect to the computing device comprises: generating machine learning input based on the one or more characteristics of the reflected signal; feeding the machine learning input into at least one machine learning network, the machine learning network trained at least in part on training data; and determining the presence of suspicious activity occurring with respect to the computing device based at least in part on a machine learning output.

22. A computer program product comprising a non-transitory computer-readable medium having a computer-readable program code embodied therein to be executed by one or more processors, the program code including instructions to: identify an identity of a user; determine, using a detection engine, if the identity of the user corresponds to authorized user data; triggering playback of an audio signal at a defined frequency from a speaker module associated with a computing device; receiving a reflected signal captured by a microphone module associated with the computing device, the reflected signal corresponding to the triggered audio signal; determining if the reflected signal contains a sound signature resulting from one or more physical gestures performed by the user when controlling the computing device; determining whether the sound signature corresponds to the user controlling one or more internal components specific to a type of the computing device; determining there is suspicious activity occurring at the computing device based on (i) the identity information not corresponding to the authorized user data, (ii) the reflected signal not containing the sound signature resulting from one or more physical gestures performed by the user when controlling the computing device, and (iii) the sound signature not corresponding to the user controlling one or more internal components specific to a type of the computing device; and in response to determining there is suspicious activity occurring, denying access to an end system computer system using the computing device.

23. The computer program product of claim 22, wherein triggering playback of an audio signal at a defined frequency from a speaker module associated with a computing device comprises: receiving a service request from the end system computer system, the service request indicating interaction between the end system computer system and the computing device; and in response to the service request, triggering one or more prompts for one or more types of computing device input at the computing device in conjunction with playback of a tone at the computing device, the tone comprising an inaudible tone due to the defined frequency; and wherein receiving a reflected signal captured by a microphone module associated with the computing device comprises: capturing the reflected signal during receipt at the computing device of the one or more types of prompted computing device input.

24. The computer program product of claim 22, wherein determining whether there is suspicious activity occurring with respect to the computing device comprises: determining whether there is a physical presence of an individual proximate to the computing device based on one or more characteristics of the reflected signal; and upon determining the physical presence of the individual, identifying one or more device characteristics of the computing device based on the one or more characteristics of the reflected signal.

25. The computer program product of claim 24, further comprising: comparing the one or more characteristics of the reflected signal with user identity validation data; and determining whether the individual is an authorized individual based on a result of the comparison.

26. The computer program product of claim 22, wherein determining whether there is suspicious activity occurring with respect to the computing device comprises: generating machine learning input based on the one or more characteristics of the reflected signal; feeding the machine learning input into at least one machine learning network, the machine learning network trained at least in part on training data; and determining the presence of suspicious activity occurring with respect to the computing device based at least in part on a machine learning output, the training data based at least in part on one or more audio files representing sound characteristics of various types of physical gestures input commands performed on a plurality of types of computing devices.

27. The computer program product of claim 22, wherein the physical gesture is a hands-free interaction with the computing device.

28. The computer program product of claim 27, wherein the hands-free interaction with the computing device comprises at least one of: a breathing pattern, a lip movement, or a body movement.

* * * * *